UNITED STATES PATENT OFFICE.

WALTON DWIGHT, OF CHICAGO, ILLINOIS.

IMPROVEMENT IN ARTIFICIAL MARBLE, &c.

Specification forming part of Letters Patent No. 195,920, dated October 9, 1877; application filed September 13, 1877.

*To all whom it may concern:*

Be it known that I, WALTON DWIGHT, of the city of Chicago, in the county of Cook and State of Illinois, have invented a new and useful Improvement in Artificial Marble, "Marble - Cement," and other compositions the basis of which is plaster-of-paris, or a stone cement, whereby such compositions are rendered impervious to water and insoluble therein, and thus better adapted than hitherto for the manufacture of coffins, vaults, and other receptacles for the dead.

Burial-cases molded from artificial marble, and notably from the composition known as "Keene's marble-cement," are coming extensively into use, and the practical tests to which they have been subjected have proved them to be admirably adapted for their purpose in every respect save one, their defect being the solubility in water of the compositions from which they are formed, in consequence whereof they in time become more or less corroded and otherwise damaged when laid in any other than perfectly dry ground. This is equally true of vaults and the like, which are always more or less exposed to the influences of the weather.

The object of my invention, as above implied, is to overcome this defect.

To this end my said invention consists in thoroughly saturating the material or composition above mentioned with an oleaginous or resinous substance, whereby the pores and cells become completely filled, and the composition is rendered water-repellent and almost absolutely insoluble.

In practically applying my invention I allow the composition (generally Keene's marble-cement, as aforesaid) to become thoroughly dry after it has been molded into the desired shape, and then immerse it in boiling-hot paraffine, allowing it to remain until it has become completely saturated. Artificial marbles and similar compositions are all of capillary structure, and hence highly bibulous in character, so that the hot oil readily permeates even a large mass.

While, as at present advised, I recommend paraffine as the most effective of oily substances, and the above-described method of its application as the most practicable, I nevertheless do not limit myself to either, since any other process which will cause the paraffine to become intimately associated with every part of the composition may be employed without departing from the spirit of my invention; and other substances adapted to produce substantially the same effects as paraffine may be substituted therefor, though it is preferable, for obvious reasons, that such substitute be of a like waxy nature, and similarly free from color. Stearine and spermaceti are well adapted for the purpose. A resinous substance may be substituted, if cheaper, or more convenient for any other reason, and it may be applied by any suitable process. For example, refined rosin may be dissolved in benzine, and the marble composition immersed in this solution, which soon saturates it; or the rosin may be melted and diluted with turpentine. Upon removing the composition from the bath the benzine or turpentine speedily evaporates, leaving only the rosin within the pores.

The effect produced upon Keene's marble-cement by immersion in melted paraffine is such that a small piece may be subjected for many days to the action of water, dripping upon it, say, from a faucet, without suffering any appreciable diminution of size, whereas a similar piece in its ordinary state is reduced in bulk about one-third in eighteen hours when so acted upon.

A further advantage which artificial marble acquires from my treatment hereinbefore described is the capability of receiving a fine, rich polish. This fact, together with that of its durability, renders it adaptable for many purposes besides these hereinbefore named, among which may be mentioned tombstones, particularly those of the smaller and lighter kinds.

What I claim as new, and desire to secure by Letters Patent, is—

1. An artificial-marble composition suitable for forming burial-cases, the basis of which is plaster-of-paris or a stone cement treated by saturation with paraffine or other oleaginous substance, or with a resinous substance, substantially as described.

2. The process herein described for rendering artificial-marble and similar compositions water-repellent and insoluble, which consists in immersing them for a time in a bath composed of melted paraffine, substantially as specified.

WALTON DWIGHT.

In presence of—
 FRED. LEHMANN,
 MICH. PETRIE.